US007979487B2

(12) United States Patent
Meyer et al.

(10) Patent No.: US 7,979,487 B2
(45) Date of Patent: Jul. 12, 2011

(54) MICROPHONE DEVICE

(75) Inventors: Jens M. Meyer, Fairfax, VT (US); Gary W. Elko, Summit, NJ (US); Steven L. Backer, Palo Alto, CA (US)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 214 days.

(21) Appl. No.: 12/253,455

(22) Filed: Oct. 17, 2008

(65) Prior Publication Data

US 2009/0226006 A1 Sep. 10, 2009

Related U.S. Application Data

(60) Provisional application No. 60/981,177, filed on Oct. 19, 2007.

(51) Int. Cl.
*G06F 15/16* (2006.01)

(52) U.S. Cl. .......... 709/201; 709/202; 381/77; 381/122; 381/150

(58) Field of Classification Search .................... 381/77, 381/94.1, 71.1, 122, 150; 709/201, 202
See application file for complete search history.

(56) References Cited

U.S. PATENT DOCUMENTS 5,781,643 A 7/1998 Anderson
6,622,820 B2 9/2003 Pavlovic
6,829,360 B1 * 12/2004 Iwata et al. .................... 381/61
7,171,008 B2 1/2007 Elko
2002/0037088 A1 3/2002 Dickel et al.
2003/0147538 A1 8/2003 Elko
2005/0036629 A1 * 2/2005 Aubauer et al. ............ 381/71.1

FOREIGN PATENT DOCUMENTS

JP 06269084 9/1994
WO WO 2007/059255 5/2007

* cited by examiner

*Primary Examiner* — Frantz B Jean
(74) *Attorney, Agent, or Firm* — Kilpatrick Townsend & Stockton LLP

(57) ABSTRACT

A microphone device is provided which comprises a main microphone (MM), at least one control microphone (CM) and a digital signal processing unit (DSP) coupled to the main microphone (MM) and the at least one control microphone (CM). The digital signal processing unit (DSP) receives the output of the main microphone (MM) and the output of the at least one control microphone (CM). Based on the output signals, the digital signal processing unit (DSP) is adapted to perform a noise suppression of pop noise in the output signal of the main microphone (MM).

8 Claims, 4 Drawing Sheets

MICROPHONE DEVICE

Figure 1:
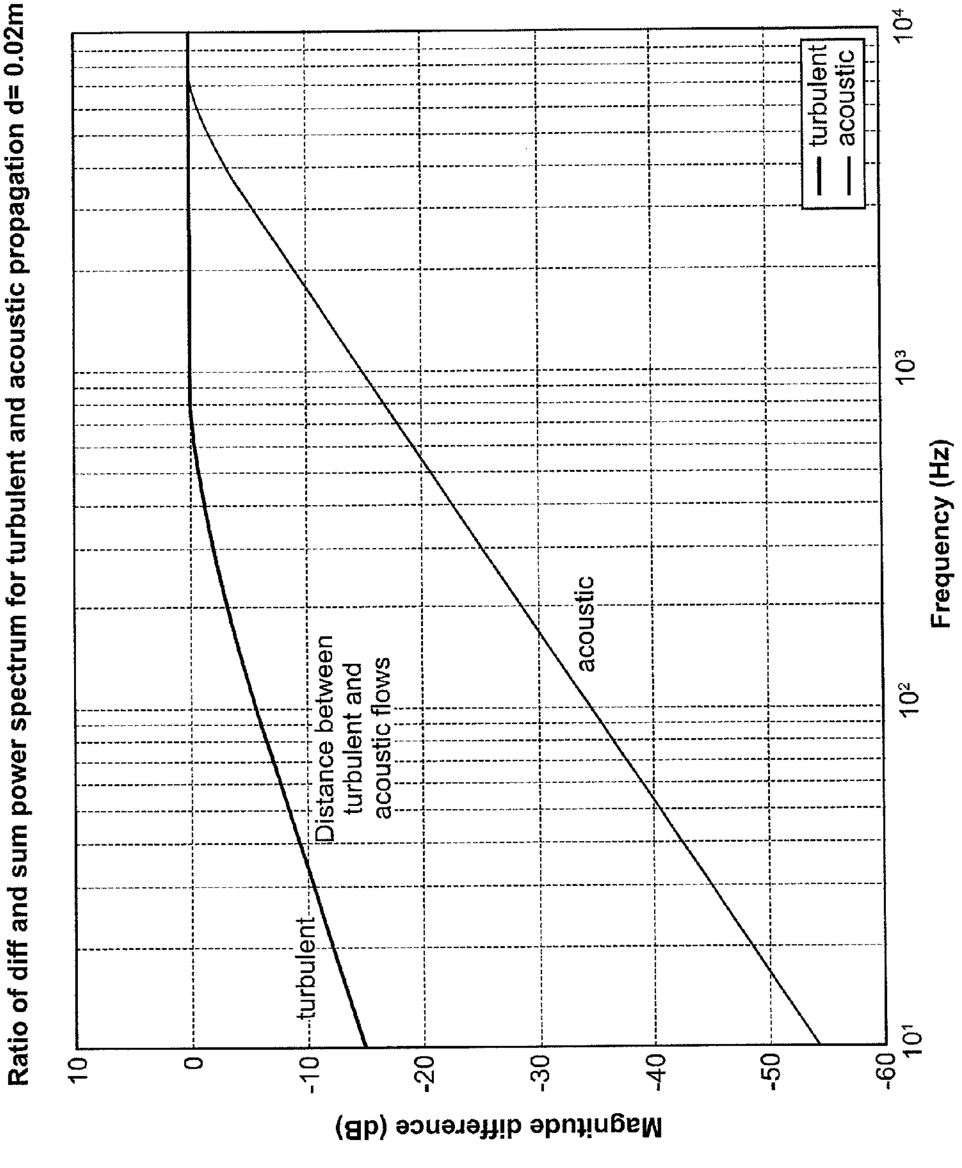

This application is a non-provisional of and claims the benefit of U.S. Patent Application No. 60/981,177, filed on Oct. 19, 2007, which is herein incorporated by reference in its entirety for all purposes.

The present invention relates to a microphone device.

Pop noises which are generated by speakers or singers are a major concern for microphone manufacturers. The articulation of speech plosives (p, t, k) can lead to a degradation of the quality of the recording or performing. The problem of pop noises is in particular relevant for pressure-gradient microphones. The pop noise constitutes an unwanted artifact and may additionally lead to a distortion of the directional pattern of the microphone.

U.S. Pat. No. 6,622,820 discloses a pop shield for microphones. In U.S. Pat. No. 5,781,643, a microphone for reducing the distortion of an audio signal due to plosive sounds is described.

Furthermore, pop-shields have been manufactured from foam or a stretch cloth and have been applied to the microphone to reduce the effects of pop-noise.

However, it is an object of the present invention to provide a microphone device with an improved pop protection.

This object is solved by a microphone device and a method according to the claims.

Therefore, a microphone device is provided which comprises a main microphone, at least one control microphone and a digital signal processing unit coupled to the main microphone and the at least one control microphone. The digital signal processing unit receives the output of the main microphone and the output of the at least one control microphone. Based on the output signals, the digital signal processing unit is adapted to perform a noise suppression of pop noise in the output signal of the main microphone.

According to an aspect of the invention, the digital signal processing unit comprises a summation unit for summing the signals of the at least one control microphone to determine the sum power ratio, a subtracting unit for subtracting the signals from the at least one control microphone to determine a difference power ratio and a calculating unit for comparing the measured ratio to a maximum threshold value. A disturbance occurs if the measured ratio exceeds the maximum threshold value.

According to a further aspect of the invention, the digital signal processing unit comprises a suppression filter having a cut-off frequency. The suppression filter performs a suppression of the pop noises if the measured ratio exceeds the maximum threshold value.

The invention relates to the idea to provide an electronic pop protection for a microphone. This can be performed by detecting the presence of pop-noise in the signal and by suppressing the pop noise electronically.

According to a further aspect of the invention, the digital signal processing unit comprises a suppression filter which performs a suppression of the pop noise if the measured ratio exceeds the maximum threshold value as determined by the calculation unit.

Further aspects of the invention are defined in the dependent claims.

Embodiments and advantages of the present invention will now be described in more detail with reference to the figures.

Figure 2:
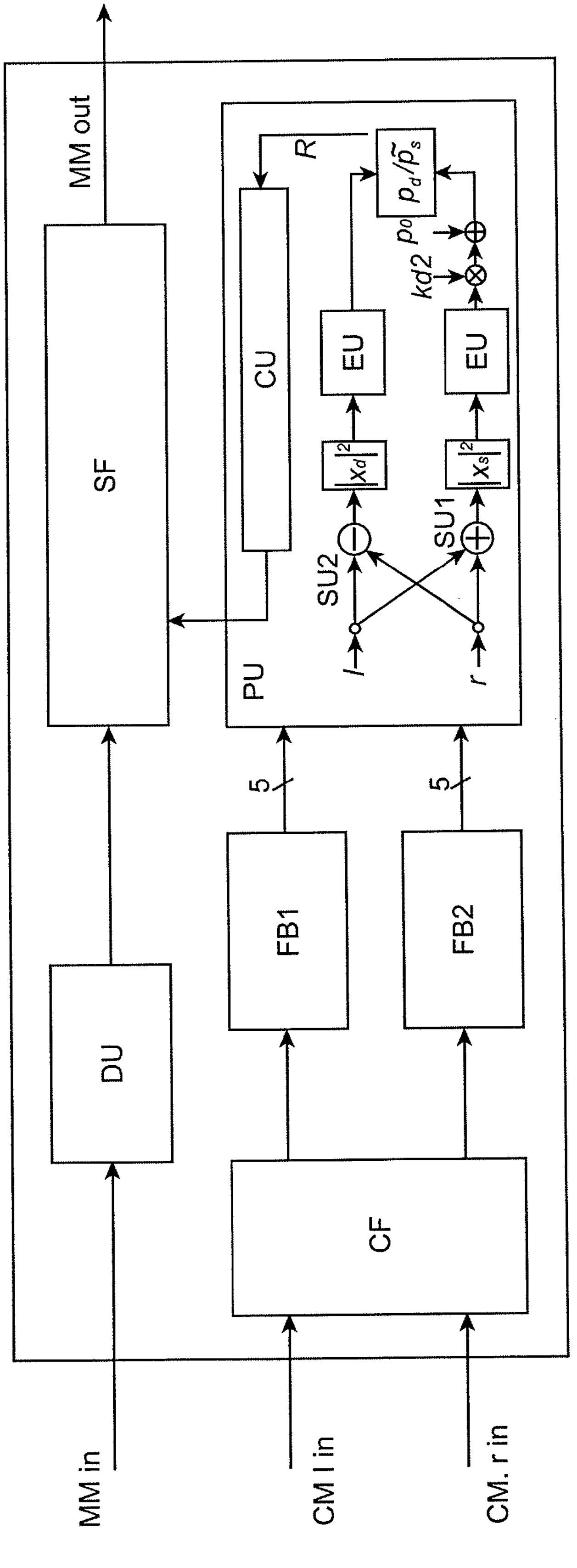
Figure 3:
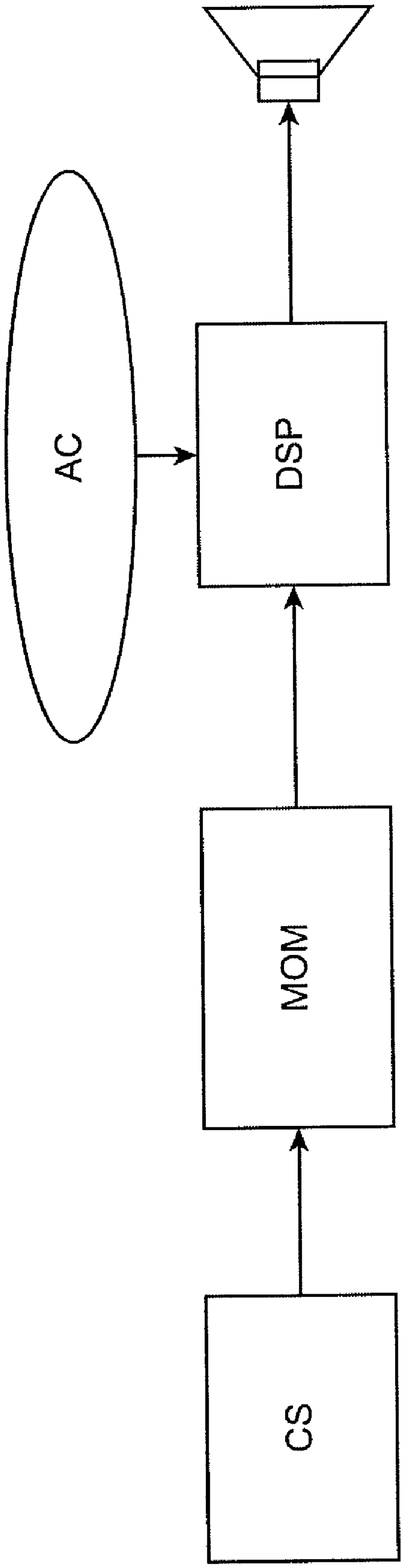
Figure 4:
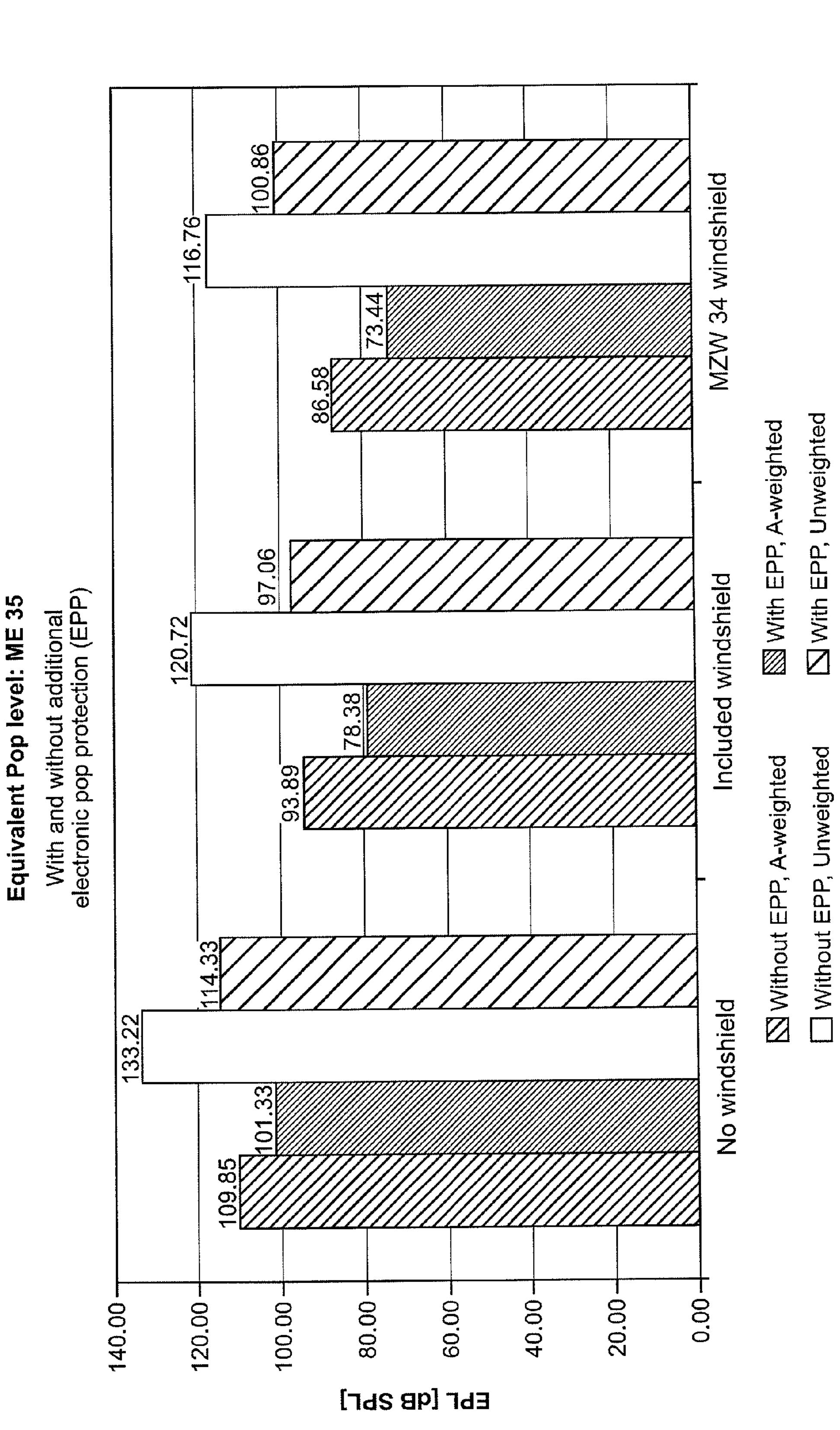

FIG. 1 shows a diagram illustrating the relation between a turbulent and acoustic flow, FIG. 2 shows a block diagram of a digital signal processing unit according to a first embodiment, FIG. 3 shows a schematic representation of a microphone device according to the first embodiment, and FIG. 4 shows a graph depicting the performance of a microphone device according to the prior art and a microphone device according to the first embodiment.

FIG. 1 shows a graph illustrating the difference between turbulent and acoustic audio signals or turbulent and acoustic flows. A convective air flow produced by speech has a speed of propagation which is much slower than the desired propagating acoustic signals. Furthermore, it rapidly decreases in correlation versus distance. If two closely spaced omni-directional microphones receive these audio signals, the ratio of the difference or power spectra to the sum of the power spectra is substantially different for turbulent and acoustic flows.

FIG. 2 shows a block diagram of a digital signal processing unit according to a first embodiment. The digital signal processing unit according to FIG. 2 can be connected to the output of a main microphone MM, to a first control microphone CMI on the left side and a second control microphone CMr for the right side. However, it should be noted that the principles of the present invention can also be implemented with merely a single control microphone. The output of the digital signal processing unit is used as the main microphone MM output. The digital signal processing unit comprises a calibration filter CF which receives the signals from the first and/or second control microphone CM. The signals from the main microphone MM are received by a delay unit DU which serves to delay the signals from the main microphone MM. The output of the calibration filter CF is forwarded to a first and/or second filter bank FB1, FB2. The output of the delay unit DU is forwarded to a suppression unit SF which can be implemented as a high-pass filter for suppression.

The output of the first and second filter banks FB1, FB2 are forwarded to a processing unit PU. The processing unit comprises a summation unit SU1, a subtracting unit SU2 and a calculation unit CU. The processing unit PU performs a subtraction and a summation of the audio signals from the first and second control microphones in the summation unit SU1 and in the subtracting unit SU2. The summation unit SU1 and the subtracting unit SU2 are used to compute sums and differences of the power ratio based on the filtered output signals from the control microphones CMI, CMr. Preferably five sub-bands are computed. In the calculating unit CU, the measured ratio is compared to a maximum ratio. If the measured ratio exceeds the maximum ratio, a disturbance (pop-noise) is present. The calculating unit CU will forward a cut-off frequency $f_c$ to the suppression filter which is determined based on the comparison. In the suppression filter SF, the suppression of the pop noises is implemented, e.g. based on the cut-off frequency $F_c$. In other words, the suppression filter SF can be implemented as a high pass filter, wherein its cut-off frequency can be adjusted. The calculating unit can determine for example whether the cut-off frequency of the suppression filter is sufficient to delimit the pop noise from the signal. If the cut-off frequency of the suppression filter is not high enough or too low, the calculating unit CU will provide a further higher or lower cut-off frequency in order to suppress the pop noise.

An attenuation filter is used to enforce the maximum allowable ratio and will therefore create a roll-off at frequencies where the turbulent flows dominate. The suppression filter can implement a time-varying suppression filter to attenuate presence of turbulent flows. The high-pass filter will be used for time-varying cutoff frequencies. The suppression filter is preferably a third order filter. The cut-off frequency $f_c$ can be determined from information with respect to the sum and difference of the power ratio.

The five frequency bands which are outputted by the filter banks FB1, FB2 serve to determine which frequency dominant pop noises are present to be able to only remove those frequencies with the dominant pop noise by means of the suppression filters.

FIG. 3 shows a basic illustration of a microphone device according to a first embodiment. Corrupted speech CS, i.e. speech with pop noise, is received by a modified microphone MOM (which may comprise a main microphone MM and a first and/or second control microphone CM). The output of the modified microphone MOM is forwarded to the digital signal processing unit DSP (as depicted in FIG. 2). In the digital signal processing unit DSP, the digital signal processing will be performed based on an algorithm code AC. The output of the digital signal processing unit can be forwarded to a loudspeaker or any other audio signal processing device.

It should be noted that the modified microphone for example comprises a back-electret condenser microphone as main microphone and back-electret condenser microphone capsules as control microphones. The control microphones can be implemented as small electret microphones and can be mounted on opposite sides of the main microphone. One control microphone can also be mounted in front of the main microphone. The control microphones may be mounted by means of brackets, clips, glue or any other basic means of attachment. If two control microphones are used, they can be arranged to be spaced approximately 15 mm apart.

The output of the main microphone as well as the output of the control microphones can be supplied to the digital signal processing unit DSP, which could be incorporated in the same housing as the microphone or which can be incorporated in an external device. The digital signal processing unit is adapted to apply a noise-suppression scheme on the output signals of the main microphone and the control microphones. The digital signal processing unit can be adapted to perform a noise-suppression method as described in U.S. Pat. No. 7,171,008; its content is enclosed herein entirely by reference. The noise suppression method according to U.S. Pat. No. 7,171,008 is adapted specifically for an optimal performance in the presence of pop noise.

The digital signal processing unit DSP is adapted to perform the electronic pop protection algorithm in real time. As an example, the processing of the filtering and signal routing can occur in an embedded DSP running at 48 hHz sample rate. The three microphones, i.e. the main microphones and the two control microphones, can be plugged directly into the digital signal processing unit DSP.

In order to determine the amount of additional protection which is provided according to the principles of the invention, an equivalent pop level EPL can be measured for the microphone under various conditions. The EPL matrix is essentially a measurement of pop sensitivity:

$$EPL=20\ \log_{10}(V_{POP}/V_{SENS})+94\ \text{db}\ SPL,$$

wherein $V_{POP}$ corresponds to the measured output voltage due to pop stimulus and $V_{SENS}$ corresponds to the output voltage at 1 kHz, 1 Pa.

FIG. 4 shows a graph for illustrating the performance of the microphone device according to the first embodiment as compared to a microphone device according to the prior art. In FIG. 4, in particular the equivalent pop level with and without additional pop protection according to the invention is depicted.

Accordingly, the electronic pop protection according to the present invention will lead to a lower pop sensitivity irrespective of the presence of a wind shield. If the electronic pop protection is added to a microphone with a wind shield, a quite large reduction in pop sensitivity can be achieved. The pop sensitivity can be significantly reduced if a pop shield and the electronic pop protection according the present invention is used. If the electronic pop protection is used in connection with a microphone, the overall lowest pop sensitivity can be achieved. The increase or decrease in pop sensitivity appears to correlate with the perception of an increase or decrease in the "pop effect".

The microphone device as described in the above can be applied in the field of acoustics, sound reinforcement and communication, i.e. it can be used as a podium microphone, a lavalier microphone, conferencing and teleconferencing stations, electronic news gathering, studio, broadcast and public addresses.

The invention claimed is:

1. Microphone device, comprising:

a main microphone;

at least one control microphone; and a digital signal processing unit, coupled to the main microphone and the at least one control microphone for receiving a first signal from the main microphone and for receiving a second signal from the at least one control microphone and for emitting a third signal, said digital signal processing unit comprising a suppression filter for receiving the first signal, for performing a noise-suppression of pop noise and for emitting the third signal, wherein the suppression filter is a high pass filter with an adjustable cut-off frequency, and a processing unit for determining the cut-off frequency based on the second signal.

2. Microphone device, comprising:

a main microphone;

at least one control microphone; and a digital signal processing unit, coupled to the main microphone and the at least one control microphone for receiving a first signal from the main microphone and for receiving a second signal from the at least one control microphone and for emitting a third signal, said digital signal processing unit comprising a suppression filter for receiving the first signal, for performing a noise-suppression of pop noise and for emitting the third signal, wherein the suppression filter is a high pass filter with an adjustable cut-off frequency, and a processing unit for determining the cut-off frequency based on the second signal, wherein the processing unit is adapted to receive the second signal, wherein the second signal comprises a fourth signal from a first control microphone and a fifth signal from a second control microphone;

calculate the signal power of the difference-signal between the fourth signal and the fifth signal;

calculate the signal power of the sum-signal of the fourth signal and the fifth signal; and calculate the ratio of the difference-signal power to the sum-signal power, and wherein the processing unit comprises a calculating unit for comparing the ratio to a maximum threshold value and for adjusting the cut-off frequency if the determined ratio exceeds the maximum threshold value.

3. Microphone device according to claim 2, wherein the digital signal processing unit furthermore comprises:

a first filter bank for computing a first set of frequency band signals from the fourth signal;

a second filter bank for computing a second set of frequency band signals from the fifth signal, wherein the output of the first and second filter banks are forwarded to the processing unit; and the processing unit is adapted to calculate a set of ratios of the difference-signal power to the sum-signal power from each two elements of the first and second signal set that belong to the same frequency band;

compare each element of the set of ratios to an associated maximum threshold value; and adjust the cut-off frequency in a way, that only those frequencies with dominant pop noise are removed.

4. Microphone device according to claim 2, wherein the calculating unit is adapted to provide a lower cut-off frequency if the ratio of the difference-signal power to the sum-signal power does not exceed the maximum threshold value any more.

5. Method for suppressing pop noises in a microphone device having a main microphone, at least one control microphone and a digital signal processing unit, coupled to the main microphone and the at least one control microphone comprising the steps of:

receiving a first signal from the main microphone, receiving a second signal from the at least one control microphone and emitting a third signal;

filtering the first signal with a suppression filter to suppress pop noises and to obtain the third signal, wherein the suppression filter is a high pass filter with an adjustable cut-off frequency; and determining the cut-off frequency based on the second signal.

6. Method for suppressing pop noises in a microphone device having a main microphone, at least one control microphone and a digital signal processing unit, coupled to the main microphone and the at least one control microphone comprising the steps of:

receiving a first signal from the main microphone, receiving a second signal from the at least one control microphone and emitting a third signal;

filtering the first signal with a suppression filter to suppress pop noises and to obtain the third signal, wherein the suppression filter is a high pass filter with an adjustable cut-off frequency; and determining the cut-off frequency based on the second signal, wherein determining the cut-off frequency comprises the steps of:

receiving the second signal, wherein the second signal comprises a fourth signal from a first control microphone and a fifth signal from a second control microphone;

calculating the signal power of the difference-signal between the fourth signal and the fifth signal;

calculating the signal power of the sum-signal of the fourth signal and the fifth signal;

calculating the ratio of the difference-signal power to the sum-signal power;

comparing the ratio to a maximum threshold value; and adjusting the cut-off frequency if the calculated ratio exceeds the maximum threshold value.

7. Method for operating a microphone device according to claim 6, wherein determining the cut-off frequency furthermore comprises the steps of:

computing a first set of frequency band signals from the fourth signal, using a first filter bank;

computing a second set of frequency band signals from the fifth signal, using a second filter bank;

calculating a set of ratios of the difference-signal power to the sum-signal power from each two elements of the first and second signal set that belong to the same frequency band;

comparing each element of the set of ratios to an associated maximum threshold value; and adjusting the cut-off frequency in a way, that only those frequencies with dominant pop noise are removed.

8. Method for operating a microphone device according to claim 6, further comprising the step of:

providing a lower cut-off frequency is if the ratio of the difference-signal power to the sum-signal power does not exceed the maximum threshold value any more.

* * * * *

UNITED STATES PATENT AND TRADEMARK OFFICE

CERTIFICATE OF CORRECTION

PATENT NO. : 7,979,487 B2
APPLICATION NO. : 12/253455
DATED : July 12, 2011
INVENTOR(S) : Meyer et al.

It is certified that error appears in the above-identified patent and that said Letters Patent is hereby corrected as shown below:

In the Specification:

Column 1, Line 8: please add a “,” after “Pop noises” and “singers”.

Column 1, Line 42: please add a “,” after “power ratio”.

Column 2, Line 53: please add a “,” after “e.g.”.

Column 2, Line 56: please add a “,” before and after “for example”.

Column 4, Line 13: please delete “in the” just before “above”.

Column 4, Line 15: please delete “communication, i.e. it can be used as a podium microphone, a lavalier microphone, conferencing and teleconferencing stations, electronic news gathering, studio, broadcast and public addresses” and insert --communication; i.e., it can be used as a podium microphone; a lavalier microphone; a conferencing station; a teleconferencing station; for electronic news gathering; and for studio, broadcast and public addresses--.

In the Claims:

Column 4, Line 20: please add “A” before “Microphone device”.

Column 4, Line 35: please add “A” before “Microphone device”.

Column 4, Line 64: please add “A” before “Microphone device”.

Column 5, Line 11: please delete the “,” after “way”.

Column 5, Line 14: please add “A” before “Microphone device”.

Column 5, Line 19: please add “A” before “Method”.

Column 5, Line 33: please add “A” before “Method”.

Column 6, Line 20: please add “A” before “Method”.

Column 6, Line 33: please delete the “,” after “way”.

Signed and Sealed this
Eighth Day of January, 2013

David J. Kappos
*Director of the United States Patent and Trademark Office*

Column 6, Line 35: please add “A” before “Method”.

Column 6, Line 37: please delete “is if” and insert --if--.